United States Patent [19]

Polster

[11] Patent Number: 4,635,538
[45] Date of Patent: Jan. 13, 1987

[54] HAMBURGER PRESS

[76] Inventor: Louis S. Polster, 1017 Fairmount Rd., Burbank, Calif. 91501

[21] Appl. No.: 678,699

[22] Filed: Dec. 6, 1984

[51] Int. Cl.⁴ .............................................. A47J 37/06
[52] U.S. Cl. ........................................ 99/349; 99/342; 99/422; 99/426; 99/447; 220/458; 426/523
[58] Field of Search ................. 99/342, 349, 372, 422, 99/426, 447; 126/390; 220/458; 204/38.3, 37.1; 426/523

[56] References Cited

U.S. PATENT DOCUMENTS

| | | | |
|---|---|---|---|
| 1,624,214 | 4/1927 | Cannon | 99/349 |
| 2,040,676 | 5/1936 | Stevens | 99/349 X |
| 2,094,406 | 9/1937 | Mincks | 99/349 |
| 2,522,175 | 9/1950 | Hill | 99/349 |
| 2,618,258 | 11/1952 | Kroyer | 99/422 X |
| 2,765,728 | 10/1956 | Pearce | 126/390 X |
| 3,322,113 | 5/1967 | Simjian | 99/422 X |
| 3,623,422 | 11/1971 | Marshall | 99/349 X |
| 4,083,205 | 4/1978 | Clarke et al. | 100/93 P |
| 4,170,933 | 10/1979 | Meamber | 99/349 |
| 4,217,817 | 8/1980 | Meamber | 99/349 |
| 4,408,520 | 10/1983 | Wons et al. | 100/93 P |

Primary Examiner—Billy J. Wilhite
Attorney, Agent, or Firm—Allan M. Shapiro

[57] ABSTRACT

Food press has a cooking plate which is carried by a handle. A skirt surrounds the top and sides of the cooking plate and is floating with respect to the cooking plate. The cooking plate has sufficient thermal mass so that, when it is heated on a food grill surface for hamburgers, for example, and is thereafter placed on top of a frozen hamburger patty on the grill surface, the cooking plate has sufficient heat therein to cook the top of the hamburger patty while the grill surface is cooking the bottom of the hamburger patty.

A non-stick surface is created on the cooking plate by hard anodizing the cooking plate, coating it with shortening and then heating the cooking plate at about 575° F. for about 20 to 30 minutes to produce a golden brown colored non-stick surface.

16 Claims, 9 Drawing Figures

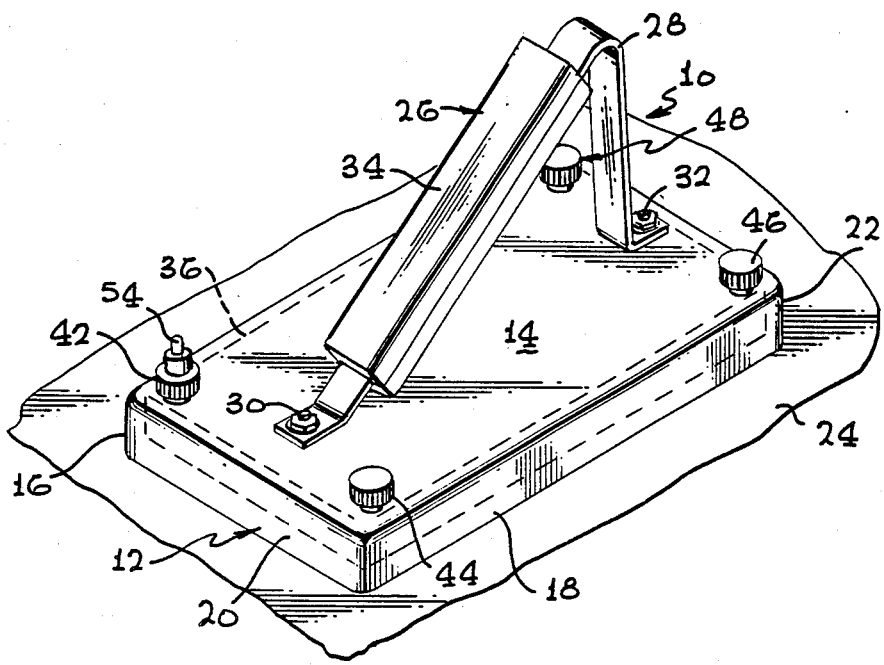
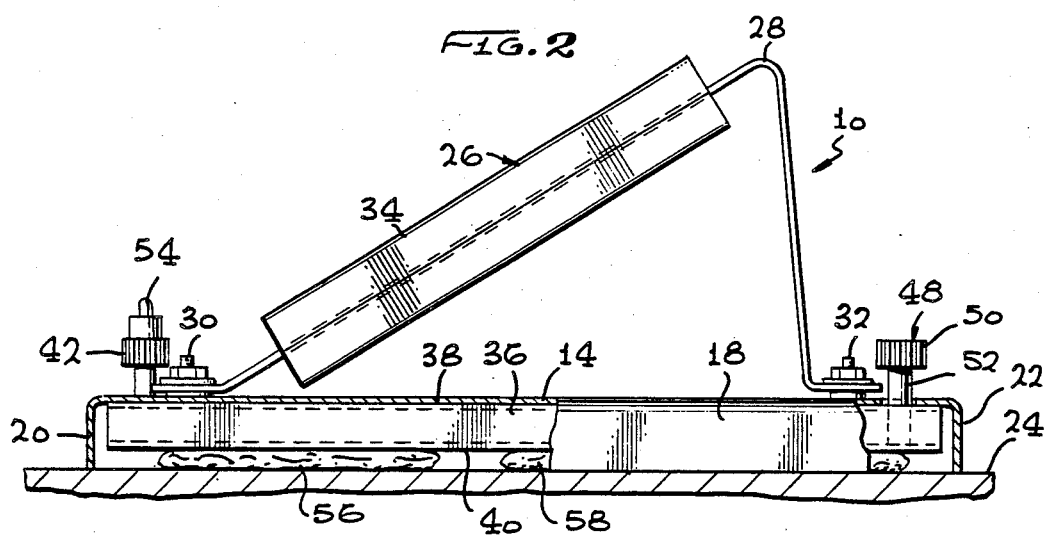
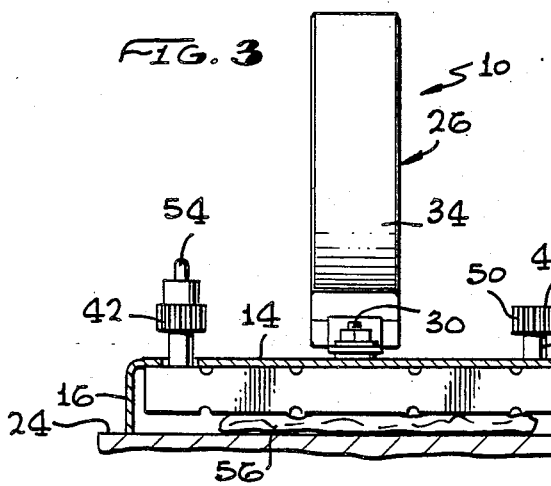
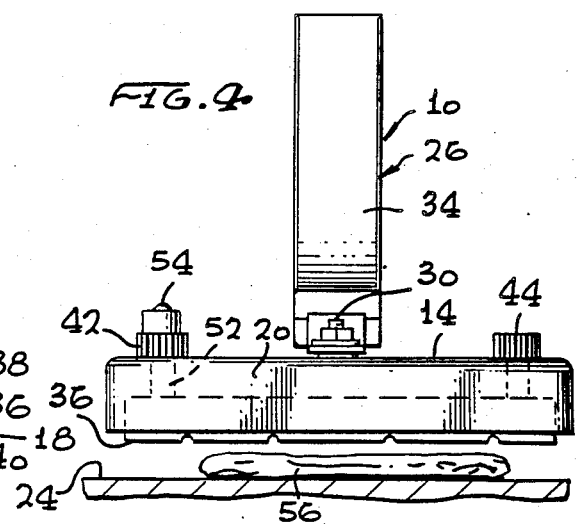

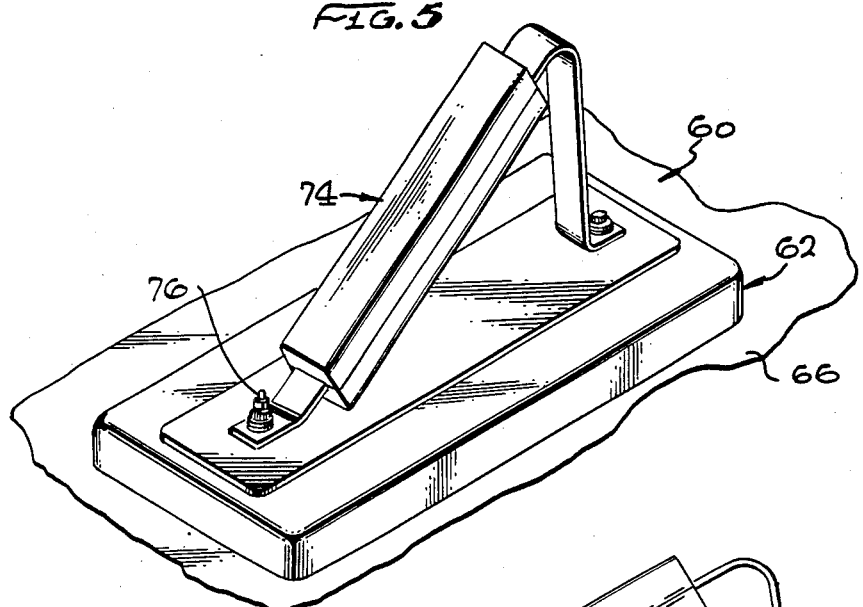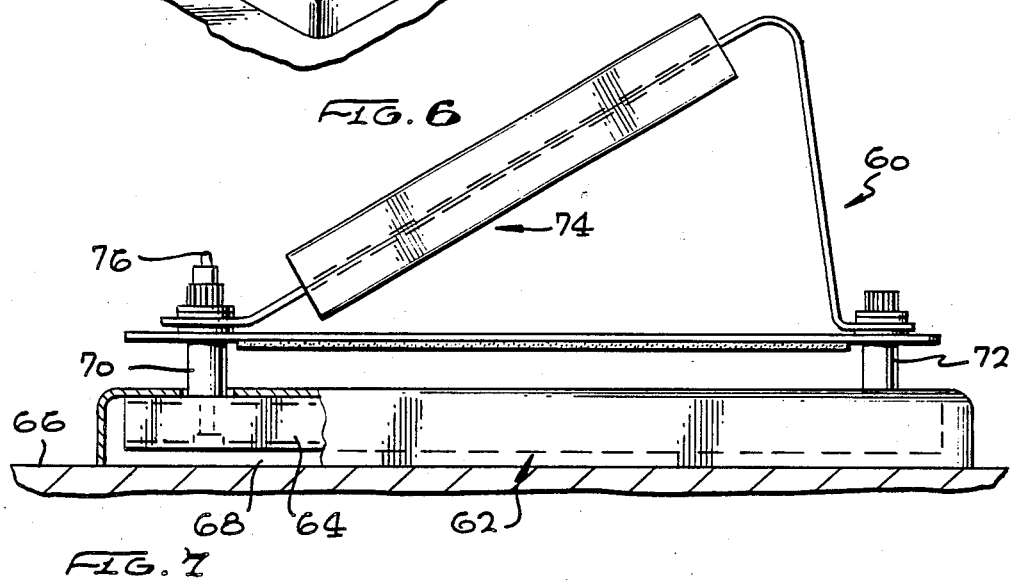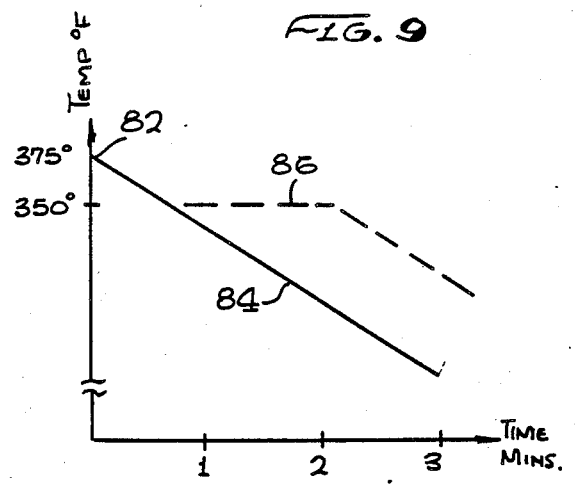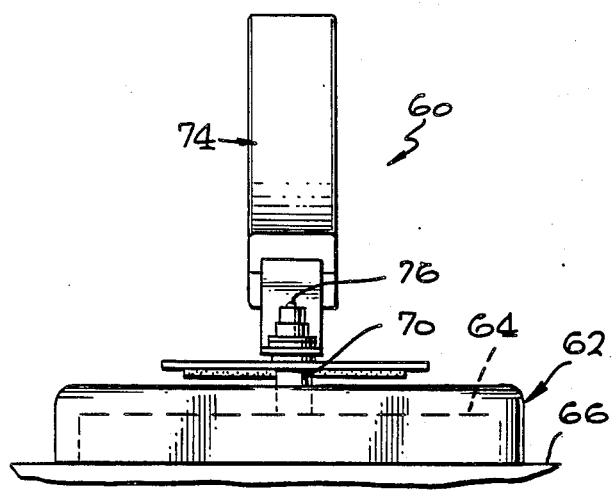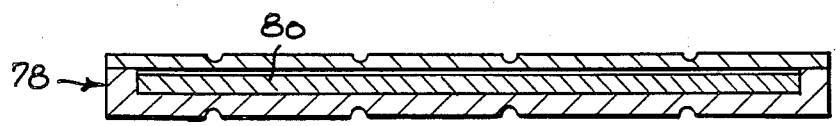

HAMBURGER PRESS

BACKGROUND OF THE INVENTION

This invention is directed to a food press for preheating and placement on top of food items such as, for example, hamburger, bacon, sausages; steaks or chicken breasts, located on a cooking grill, so as to hold the food item down and to cook the top of the food item while the cooking grill is cooking the food item from the bottom.

Most of the presses which are presently on the market are designed to put weight on the meat, hamburger or bacon in order to hold it down on the grill. Such presses have little thermal capacity and do not supply sufficient heat to accomplish cooking from the top.

Another prior art device, shown in U.S. Pat. Nos. 4,170,933 and 4,217,817, has a floating plate with many holes in it. The plate is floating with respect to another member which carries pins which can extend down through the holes in the plate. It is intended that the pins penetrate the hamburger patty to transfer heat into the hamburger for cooking. However, in modern short-order hamburger grilling, the hamburger patty is frozen and the top plate does not have sufficient thermal capacity so that the pins do not penetrate the frozen meat. After the hamburger is turned over and the cooking process is almost complete, then the pins finally penetrate. Also, that device sacrifices juiciness because a lot of juice is lost, probably from the pins penetrating the hamburger patty. The loss of juice is seen from the steam escaping from the unit. As a result, the hamburgers, are less tender, less juicy and usually shrink more than without the use of the grilling device of the present invention.

Another problem with the aforementioned prior device is that it cannot be scraped clean because of the holes and the pins. As a result, it is often encrusted and, as a result, does not really transfer as much energy as it could to the hamburger patty. Also, the prior art hamburger presses do not deal with the problem of insufficient thermal capacity to accomplish cooking a frozen hamburger patty from the top.

SUMMARY OF THE INVENTION

In order to aid in the understanding of this invention, it can be stated in essentially summary form that it is directed generally to a food press and specifically to a hamburger press having a cooking plate therein of sufficient mass so that, when the cooking plate is heated substantially to the temperature of a grill at hamburger cooking temperature, then a frozen hamburger patty is placed on the grill, and then the cooking plate is placed on top of the hamburger patty, the cooking plate supplies sufficient heat to cook the top of the hamburger patty without turning the hamburger patty over.

It is, thus, an object of.this invention to provide a hamburger press which contains a cooking plate having sufficient thermal capacity to cook the top of a frozen hamburger patty to thus cook such a hamburger patty without the necessity for turning over the hamburger patty and, furthermore, to cook the hamburger patty in a shorter time than would be necessitated by one-side cooking.

It is a further object of this invention to provide a hamburger press having a cooking plate therein for the cooking of the top of a frozen hamburger patty, which cooking plate is surfaced to minimize sticking of hamburger thereto and is flat so that it can be scraped clean with a spatula or the like so that it can be used for cooking through an entire meal period without need for specialized cleaning.

It is another object of this invention to provide a cooking plate for a hamburger press or the like wherein the cooking plate is provided with a non-stick surface by hard anodizing the surface, coating the surface with shortening and heating the cooking plate for a sufficient time at a sufficient temperature to produce a golden brown colored non-sticking surface.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an isometric view of the first preferred embodiment of the hamburger press of this invention wherein the cooking plate is floating.

FIG. 2 is an enlarged side-elevational view of the hamburger press of FIG. 1, showing it in cooking position on hamburgers on a grill, with parts broken away and parts taken in section.

FIG. 3 is a front end elevational view of the structure of FIG. 2, with parts broken away and parts taken in section.

FIG. 4 is similar to FIG. 3 showing the hamburger press about to be placed on a hamburger patty on a grill.

FIG. 5 is an isometric view of the second preferred embodiment of the hamburger press of this invention, with a floating skirt.

FIG. 6 is an enlarged side-elevational view of the hamburger press of FIG. 5, shown in cooking position with hamburgers on a grill, with parts broken away and parts taken in section.

FIG. 7 is a front end elevational view of the hamburger press of FIGS. 5 and 6, showing it in heating position on a grill.

FIG. 8 is an enlarged sectional view through a further preferred embodiment of a cooking plate for the hamburger press of this invention, showing a body of material therein having increased thermal capacity.

FIG. 9 is a graph of cooking temperature versus time for the hamburger press of this invention in accordance with FIGS. 1 and 5, and also for the cooking plate of FIG. 8.

DESCRIPTION OF THE PREFERRED EMBODIMENTS

FIGS. 1 through 4 show the first preferred embodiment of the hamburger press at 10. This embodiment is a floating plate type of hamburger press. Skirt 12 is an open-bottom, generally rectangular structure with rounded corners. It has top 14 of generally rectangular configuration, downwardly-extending skirt sides 16 and 18 and ends 20 and 22. The sides and ends are preferably formed as a unitary structure with top 14 and may be drawn from rolled aluminum flat stock into an open-bottomed skirt structure, as illustrated. The sides and ends terminate in a plane so that the skirt will rest on the flat top 24 of a hamburger cooking griddle. The griddle is heated from the bottom and has a temperature control so that the griddle top is maintained at a substantially uniform temperature, for example 375° F. for cooking hamburgers.

Handle 26 is formed with a metallic strap 28 secured to the top of skirt 12. Upward extending studs 30 and 32 are secured to the top of the skirt, and holes in the ends of strap 28 engage over the studs. Thermally insulated washers are positioned on each side of the strap 28, and nuts hold the washers in place. Hand grip 34 is made of thermal insulative material so that the exterior surface thereof remains sufficiently cool that it can be handled. As is best seen in FIGS. 1 and 2, strap 28 is of inverted V-shape so that hand grip 34 is closer to skirt 12 toward its front end, in order to place the hand grip at a convenient angle that it can be grasped by a person standing in front of it. There is sufficient space under the hand grip so that it can be grasped without touching the top of the skirt. The insulation is sufficient so that even when the skirt has been standing on the top of the heated griddle for a substantial time, the hand grip is sufficiently cool that it can be conveniently handled.

Cooking plate 36 is of rectangular configuration and size to fit within skirt 12. Cooking plate 36 has a top surface 38 and a bottom surface 40. Both of these surfaces are flat and contain a few grooves, such as four grooves directed longitudinally of the cooking plate. Cooking plate 36 is a thermal mass, and is about ½ inch thick. In the preferred embodiments of FIGS. 1 and 5, the cooking plate is solid aluminum of about ½ inch thick. Four studs 42, 44, 46 and 48 pass through openings in the corners of the top 14 of skirt 12 and are threaded into the corners of the cooking plate 36. As is best seen in FIG. 2 with respect to stud 46 and FIG. 3 with respect to stud 44, each has a head 50 mounted on a shank 52 of smaller diameter. The shank passes through the clearance hole in the top of the skirt, and the head engages on the top of the skirt so that the plate can move a limited distance (the length of the shank 52) up and down within the skirt. The shanks 52 of the studs are sufficiently long that when engaged against the top skirt, the bottom surface 40 of the cooking plate extends out of the skirt, as is illustrated in FIG. 4. Thus, as shown in FIG. 1, when the hamburger press 10 is placed upon a griddle, the bottom surface 40 of the cooking plate rests directly against the griddle top 24, as shown in FIG. 1. The lower edges of the sides and ends of the skirt rest against the griddle top around the cooking plate, as shown in FIG. 1. In this condition, the cooking plate is heated by the griddle. For cooking frozen hamburgers, the griddle is controlled so that its temperature is preferably about 375° F. When resting on the griddle top, as illustrated in FIG. 1, cooking plate 36 quickly approaches the temperature of the griddle.

A temperature indicator is preferably associated with the cooking plate. In the present instance, the temperature indicator is an indicating rod which extends upward out of the top of stud 42. Rod 54 extends upward to the position shown in FIGS. 1, 2 and 3 when the temperature of cooking plate 36 is above a predetermined value, for example 350° F. In FIG. 4, indicator rod 54 is retracted to indicate temperature below the selected value. The indicator rod can be actuated by any convenient means, such as an oil canning bimetallic disc.

In use, the press 10, possibly with several similar presses, is placed on the hot griddle and is heated thereby. When it is desired that one or two hamburgers be cooked, the frozen hamburger patties are placed adjacent each other on the grill. Since the press 10 has been on the hot grill for some time, its cooking plate 36 has reached at least 350° and temperature indicating rod 54 is extended, as shown in FIG. 1 The FIG. 1 position shows the press in the heating mode. When the hamburgers are placed on the grill, press 10 is picked up and placed on top of them. The hamburger patties are frozen when they are placed on the grill, but there is sufficient heat in the cooking plate 36 to thaw and cook the top half. The press is configured so that it will reach over two conventional hamburger patties of ¼ pound each fashioned as a right circular cylinder about ½ inch thick. Since the cooking plate 36 is floating with respect to skirt 12, the cooking plate rests upon the hamburger patties, ahd the skirt rests down on the top surface of the griddle around the hamburgers. Hamburger patties 56 and 58 are shown in FIG. 2. The thermal mass of cooking plate 36 has enough thermal energy that it will supply sufficient heat to thaw the upper portion of the hamburger and cook the top surface of the hamburger so that it seals in the juices. It also has enough thermal energy to continue to impart heat to the top surface to cook the top surface. If the cooking plate 36 is at least 350° F. at the beginning of the cooking, as is preferred, the hamburgers do not need to be turned because sufficient heat is supplied by the cooking plate 36 to cook the top half of the hamburger. However, if desired, the hamburgers can be turned so that both of the surfaces of the hamburger are brought up to the temperature of the griddle, which remains high during the cooking process. As an example of the advantages attained when using the press 10 of this invention, the total cooking time is about 2 minutes; if the hamburger was cooked on the grill surface without the use of this invention, with the grill at 375° F., the cooking time would be about 2½ minutes on each side for a total cooking time of 5 minutes.

The surface finish of the cooking plate 36 in contact with the hamburger is important to minimize sticking of the hamburger. The cooking plate 36 has longitudinal grooves therein to prevent suction from holding it too tight on a grill. The grooves are to minimize the lifting suction. Cooking plate 36 is surface finished in a number of ways. In one case, the surface is sandblasted, and then coated with a release material such as Teflon. In another case, the surface is provided with a bonded copper coating which is then plated with iron, whereupon the iron is seasoned in the manner common with cast iron cookware. Another inventive way has been discovered in connection with this invention, and comprises polishing the aluminum surface flat to a mirror finish of about 5 microinches and then hard-anodizing that surface.

Following hard anodizing, the cooking plate is coated with shortening and heated. It is heated to a sufficient temperature and for a sufficient length of time to produce a golden brown color which represents a non-stick surface. The shortening found to be most effective is a hydrogenated vegetable shortening. The time and temperature of heating to achieve the desired non-stick surface are related. At 350° F., heating must be a very long time, such as 60 days. 575° F. is the most preferred temperature, and at this temperature the golden brown color representing the non-stick surface is achieved in about 20 to 30 minutes. Intermediate temperatures and intermediate times would be expected to produce the desired results. However, at some point above 575° F., the temperature is too high to achieve the desired surface property. When heated to 800° F., for example, the golden brown non-stick surface was not achieved, but the shortening appeared to have just burned off and the desired reaction did not take place so that the non-stick surface characteristic was not achieved. Thus, the golden brown color representing the non-stick surface is achieved only by coating with the shortening and heating to an appropriate temperature for an appropriate time. Without the shortening coating, heating of the hard anodized cooking plate to those temperatures does not achieve the desired cooking surface called a non-stick cooking surface.

In summary, the cooking plate is polished, hard anodized, coated with shortening and heated for an adequate length of time and at an adequate temperature to achieve the golden brown colored non-stick surface. 575° F. is the preferred temperature with a time from 20 to 30 minutes. The temperature range starts at the bottom at about 350° F., with a very long time in the furnace, and with increasing temperature the time decreases roughly at a rate such that for every 10 degrees Centigrade increase in temperature, the reaction rate is doubled so the result is achieved in half the time. The upper limit of satisfactory temperature has not been discovered but it is above 575° F. and below 700° F.

The golden brown color represents having achieved a reaction which results in the non-stick surface. The hard anodized layer appears to be crazed by the heat treatment, but the crazing does not seem to destroy the effectiveness of the hard anodizing or the effectiveness of the resultant non-stick surface. The non-stick surface appears to result from producing a surface material of a sufficiently different energy so as to create release characteristics.

The hard anodized surface with its non-stick characteristics can be scratched. For this reason, both the top and bottom surfaces of cooking plate 36 are made the same so that it may be turned over to show a fresh surface. Thus, the studs screwed into the corners of the cooking plate can be removed, the cooking plate 36 turned over, and the studs reinserted so that a new surface is provided.

FIGS. 5, 6 and 7 show hamburger press 60 which is the second preferred embodiment of the hamburger press of this invention. Hamburger press 60 has a skirt 62 of rectangular configuration in the form of a open-bottomed cup, the same as skirt 12. Within skirt 62 is a cooking plate 64 of the same nature as cooking plate 36. Cooking plate 64 can move from the position in FIGS. 5 and 7 where the cooking plate 64 rests against griddle top 66, to a raised position within the skirt where the cooking plate rests upon hamburger patty 68 while the skirt rests on the griddle top. In the construction of hamburger press 60, studs 70 and 72 are secured into the cooking plate and extend upward through clearance holes in skirt 62. Handle 74 is secured on the top of the studs. This is a floating skirt design where the skirt floats with respect to the handle, as compared to the design of FIG. 1 where the cooking plate floats with respect to the handle. Handle 74 is similar to handle 26 and is also secured by means of thermal insulating washers and a low thermal conductivity hand grip so that the hand grip may be grasped for placing the hamburger press 60 on the griddle top and on the frozen hamburger patties to be cooked. Stud 70 is provided with temperature indicator 76 in stud 70. Hamburger press 60 is used in the same manner as hamburger press 10. Cooking plate 64 preferably has the same nonstick surface finish as does cooking plate 36.

It will be appreciated that the utilization of the hamburger presses 10 and 60 is based on sufficient thermal capacity of the cooking plates that the cooking plates can supply enough heat to thaw and cook substantially the top half of the hamburger patties. In order to enhance the heat storage capability of the cooking plate, cooking plate 78 is provided as a means for supplying additional cooking heat. Cooking plate 78 has the same cooking surfaces on its top and bottom and is configured so that it may be used in its corresponding hamburger press. Cooking plate 78 is an improved cooking plate because it is hollow and its interior hollow space contains change-of-phase material 80. Change-of-phase material 80 is preferably a eutectic metal alloy, that turns from solid to liquid as the temperature rises through about 350° and absorbs heat as it does so. Lead, tin, zinc, antimony and bismuth in various combinations can be mixed to produce an alloy having desirable thermal properties for this use. When the cooking plate 78 is utilized in one of the hamburger presses and is placed on the griddle, as the temperature of the cooking plate rises through the eutectic melting temperature of the change-of-phase material, it absorbs heat. When the hamburger press thereafter is placed on a frozen hamburger patty, the heat from the cooking plate 78 is transferred into the patty to first thaw it and then cook the top surface in the top portion. As the heat is withdrawn from, cooking plate 78 and the temperature thereof passes downward through the eutectic solidification point, more heat is given up without as much reduction in temperature of the cooking plate so that the cooking is achieved in a shorter time.

FIG. 9 shows the temperature versus time of the cooking surface of the cooking plates 36, 64 and 78. Point 82 shows that the cooking plate has reached 375° F. on the griddle. At that point, at time zero, the press is placed on one or two frozen hamburger patties on the griddle. As the hamburger is cooked, the cooking plates cool down along the line 84. There is sufficient mass to keep the temperature sufficiently high for cooking beyond two minutes. When the cooking plate 78 is used, the temperature follows line 86 which levels off at the eutectic point of the change-of-phase material due to the heat available from the solidifying change-of-phase material. The result is that the cooking temperature is maintained for a longer time.

By employing the hamburger press 10 or the hamburger press 60, with the cooking plate 36 or cooking plate 78, shortened cooking time can be achieved by adding heat to both sides of the hamburger patty, and a fully cooked hamburger patty can be obtained.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A press for cooking a food product on a heated griddle, said press having a cooking plate therein for placement on top of the food product positioned on the heated griddle to press the food product against the griddle, said cooking plate having sufficient thermal mass that when said cooking plate is first heated on the griddle substantially to griddle temperature and thereafter placed on the food product, it supplies sufficient heat to the food product to cook substantially the upper half of the food product, said cooking plate being made of aluminum and having a substantially flat bottom surface, said bottom surface having a substantially smooth finish thereon, said substantially smooth bottom surface having an anodized finish and said bottom surface having a golden brown colored non-stick surface thereon such as is achieved by coating the bottom surface with shortening and heating the bottom surface to about 575 degrees F. for about 20 to 30 minutes so as to minimize sticking of the food product to the bottom surface.

2. The press of claim 1 wherein said bottom surface of said cooking plate has a mirror finish of about five microinches which is then anodized.

3. The press of claim 1 wherein said cooking plate is surrounded on its top and sides by a skirt, and said cooking plate is floating with respect to said skirt, said press having a handle thereon so that said cooking plate may be placed on the griddle or placed on a food product on the griddle.

4. The press of claim 3 wherein said handle is secured to said skirt and said cooking plate is movably mounted with respect to said skirt, said movable mounting of said cooking plate with respect to said skirt being such that when said cooking plate rests upon the griddle, and skirt rests upon the griddle around the periphery of said cooking plate.

5. The press of claim 3 wherein
said cooking plate has an alloy contained therein which changes from liquid to solid when its temperature decreases through food product cooking temperature to give up heat to the food product.

6. The press of claim 5 wherein said alloy contained within said cooking plate changes phase from liquid to solid at about 350 degrees F.

7. The press of claim 1 wherein
said cooking plate has an alloy contained therein which changes from liquid to solid when its temperature decreases through food product cooking temperature to give up heat to the food product.

8. The press of claim 7 wherein said alloy contained within said cooking plate changes phase from liquid to solid at about 350 degrees F.

9. A press for cooking a food product on a griddle, said press comprising:
an aluminum cooking plate having a substantially flat substantially smooth lower cooking surface, said lower cooking surface being impregnated with a non-stick compound, the lower surface of said cooking plate being sufficiently large to reach the periphery of a cylindrical hamburger patty one half-inch thick weighing one-quarter pound, there being sufficient thermal mass in said cooking plate to cook a one-quarter pound frozen hamburger patty in two minutes when the griddle temperature is 375 degrees F. and said cooking plate is initially heated to between 350 and 375 degrees F.;
said cooking plate having an alloy contained therein which changes from liquid to solid when its temperature decreases through food product cooking temperature of about 350 degrees F. to give up heat to the food product;
a skirt having a top positioned over said cooking plate and having sides and ends extending downwardly around the periphery of said cooking plate, said cooking plate being floatingly mounted with respect to said skirt so that said cooking plate can move in a position wherein its lower surface lies in the same plane with said sides and edges of said skirt to a position where said cooking plate is entirely within said skirt; and
a handle secured to said press so that said press may be placed on the griddle to be heated by the griddle and can be placed upon a food product on the griddle, said cooking plate having sufficient thermal mass that when it is heated substantially to griddle temperature when the griddle is at food product cooking temperature, and is thereafter placed on a food product on the griddle, said cooking plate supplies sufficient heat to the food product to cook substantially the upper half of the food product.

10. The press of claim 9 wherein said cooking plate is floating with respect to said skirt by means of elongated studs secured to said cooking plate and passing through said skirt.

11. The press of claim 10 wherein said handle is secured to said studs.

12. The press of claim 11 wherein said non-stick compound impregnated into said anodized surface is a heat treated shortening compound such as is produced by heating the shortening coated anodized surface to 575 degrees F. for 20 to 30 minutes.

13. The press of claim 9 wherein said non-stick compound impregnated into said anodized surface is a heat treated shortening compound such as is produced by heating the shortening coated anodized surface to 575 degrees F. for 20 to 30 minutes.

14. A cooking plate having a non-stick surface comprising:
a body having a substantially flat aluminum face having a smoothness of about 5 microinches;
an anodized surface on said substantially smooth, substantially flat aluminum face, said anodized surface on said substantially smooth, substantially flat face having been reacted with shortening to produce a golden brown non-stick surface such as is produced when the shortening coated surface is heated at 575 degrees F. for a time of 20 to 30 minutes.

15. The cooking plate of claim 14 wherein said cooking plate is incorporated into a hamburger press.

16. The cooking plate of claim 14 wherein said cooking plate has an alloy contained therein which changes phase from liquid to solid at about 350 degrees F. as its temperature decreases through this food product cooking temperature to give up heat to the food product.

* * * * *